US012769880B2

(12) United States Patent
Hapfelmeier et al.

(10) Patent No.: US 12,769,880 B2
(45) Date of Patent: Oct. 20, 2026

(54) SYSTEM AND METHOD FOR PROVIDING DATA PRIVACY RISK OF DATA PRIVACY RELATED DATA OBJECTS FOR ASSIGNING AN ACCESS RIGHT

(71) Applicant: Siemens Aktiengesellschaft, Munich (DE)

(72) Inventors: Andreas Hapfelmeier, Sauerlach (DE); Arthur Schmid, Munich (DE); Filip Galabov, Munich (DE); Victor Balanica, Ingolstadt (DE); John Andrew Donald, Höhenkirchen-Siegertsbrunn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 45 days.

(21) Appl. No.: 18/857,207

(22) PCT Filed: Mar. 23, 2023

(86) PCT No.: PCT/EP2023/057461
§ 371 (c)(1),
(2) Date: Oct. 16, 2024

(87) PCT Pub. No.: WO2023/208481
PCT Pub. Date: Nov. 2, 2023

(65) Prior Publication Data

US 2025/0265372 A1 Aug. 21, 2025

(30) Foreign Application Priority Data

Apr. 26, 2022 (EP) .................................... 22169908

(51) Int. Cl.
*G06F 21/00* (2013.01)
*G06F 21/57* (2013.01)
*G06F 21/62* (2013.01)

(52) U.S. Cl.
CPC ........ *G06F 21/6254* (2013.01); *G06F 21/577* (2013.01); *G06F 21/6227* (2013.01)

(58) Field of Classification Search
CPC . G06F 21/6227; G06F 21/577; G06F 21/6254
See application file for complete search history.

(56) References Cited

U.S. PATENT DOCUMENTS 10,963,571 B2 * 3/2021 Bar Joseph ............. H04L 63/20
2018/0114037 A1 4/2018 Scaiano et al.

(Continued)

OTHER PUBLICATIONS

PCT International Search Report and Written Opinion of International Searching Authority mailed Jun. 14, 2023 corresponding to PCT International Application No. PCT/E P2023/057461 filed Mar. 23, 2023.

*Primary Examiner* — Rodman Alexander Mahmoudi
(74) *Attorney, Agent, or Firm* — Schmeiser Olsen PLLC

(57) ABSTRACT

A system for providing data privacy risk of data privacy related data objects for assigning an access right for processing and storing the data objects, including receiving more than one data object and extracting data from the data objects, generating at least one identity space, wherein the identity space includes those data objects which include extracted data elements concerning a group of individuals or a subset of the group of individuals, and wherein the group of individuals differs from the group of individuals of each other identity space, calculating at least one privacy risk for each identity space and for the contained individuals depending on re-identification probabilities of each individual based on the extracted data elements in the identity space and depending on a set of background knowledge (Continued)

Figure 1:
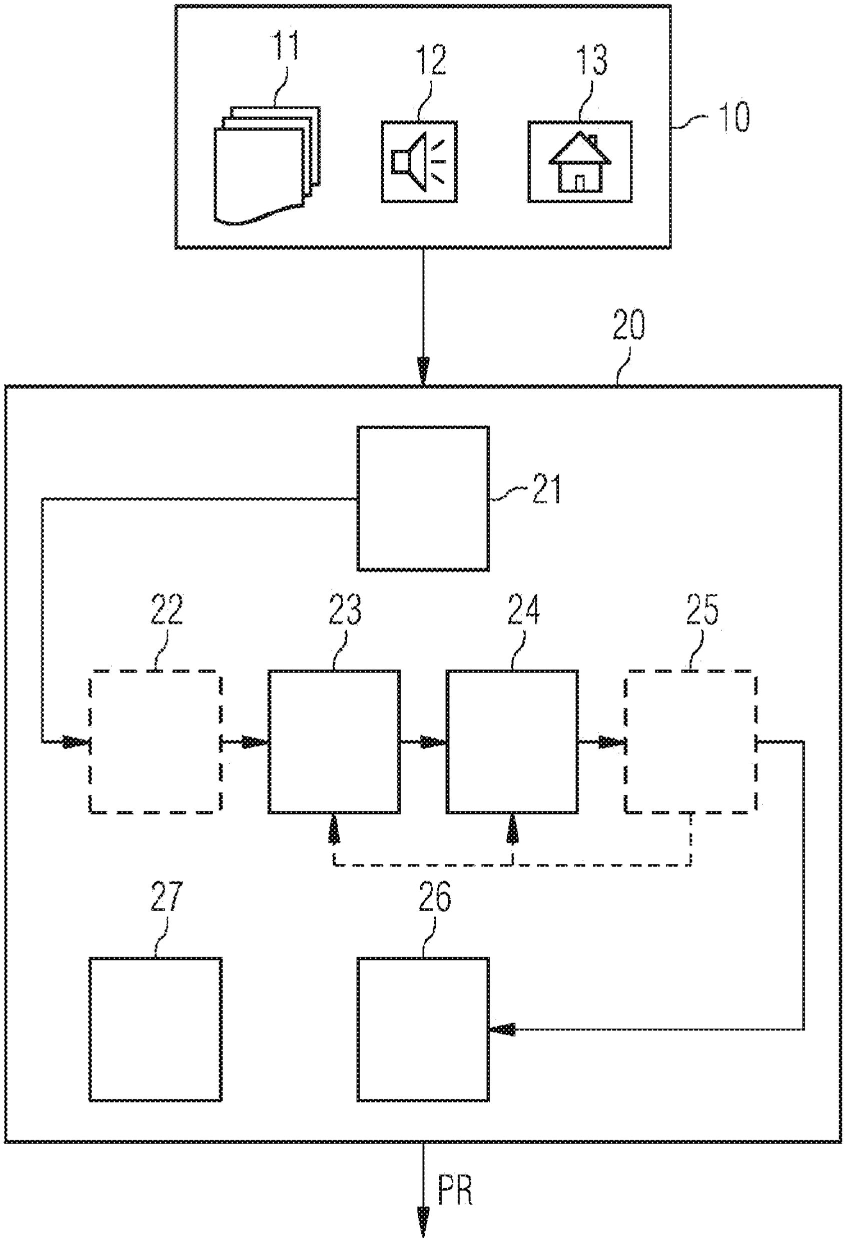

which is assumed to be known, exporting the extracted data and export the calculated privacy risk.

15 Claims, 3 Drawing Sheets

(56) References Cited

U.S. PATENT DOCUMENTS

| | | | | |
|---|---|---|---|---|
| 2021/0150056 | A1 | 5/2021 | Vax et al. | |
| 2022/0300653 | A1* | 9/2022 | Wrenn | G06F 21/577 |
| 2025/0265372 | A1* | 8/2025 | Hapfelmeier | G06F 21/577 |

* cited by examiner

SYSTEM AND METHOD FOR PROVIDING DATA PRIVACY RISK OF DATA PRIVACY RELATED DATA OBJECTS FOR ASSIGNING AN ACCESS RIGHT

CROSS-REFERENCE TO RELATED APPLICATIONS

This application is a national stage of PCT Application No. PCT/EP2023/057461, having a filing date of Mar. 23, 2023, which claims priority to EP Application No. 22169908.5, having a filing date of Apr. 26, 2022, the entire contents both of which are hereby incorporated by reference.

FIELD OF TECHNOLOGY

The following relates to a system for assigning an access right to data objects comprising data related to individuals, i.e., relevant for data privacy, a computer-implemented method, and a computer program product.

BACKGROUND

Data with personal information is covered by General Data Privacy Regulations, e.g., of EU Law. It is strongly motivated by the General Data Privacy Regulation (GDPR) to apply information minimization and anonymization and pseudonymization to protect the person and its data.

The risk to identify a person and for that its information should be as low as possible. Anonymized data would have the benefit that it is no longer considered as personal data and can be freely used and accessed without the requirements or limitations given by the GDPR. Data with pseudonymized information and limited amount of personal information have the benefit that when breaches or some kind of data loss happens, the damage with respect to data privacy violation would be reduced.

The same applies for data comprising information concerning restricted items like trade secrets, e.g., details of a manufacturing process, product composites and the like.

Often it is not visible at a first glance that data is considered as personal data or data related to a restricted item as it can also be non-direct person or restricted item identifying data, e.g., time series of temperature data measured in a flat or surrounding of a machine, which can lead to individual related information, when it is connected with other data, e.g., a shift schedule of a person or a maintenance plan of the machine.

In consequence storing, processing, or sharing of data comprising personal information or restricted items has to be restricted depending on the risk to identify the person and restricted item by the data. This is especially the case when data from different sources and concerning different aspects of the person or restricted item shall be stored in the same data storage and/or shall be accessible and processed by the same data user.

US 2021/0150056 A1 discloses a privacy management platform which is configured to scan identity, primary and/or secondary data sources in order to provide users with visibility into stored personal information, risk associated with storing such information and usage activity relating to such information. The platform may correlate personal information to specific data subjects to provide an indexed inventory across multiple data sources.

US 2018/114037 A1 discloses a method for estimating a re-identification risk of a single individual in a dataset. The individual, subject or patient, is described by a data subject profile such as a record in the dataset. A population distribution is determined by one or more quasi-identifying fields identified in the data subject profile. An anonymity value is calculated from an aggregated information value and a size of a population associated with the dataset. A re-identification metric for the individual from the anonymity value is then calculated.

Identifying and mitigating privacy risks in data is hard to accomplish due to the fact that information of a person or restricted item can be scattered over different data sources and files in different formats and types (databases, csv files, excels, images, pdfs, just to mention a view). A representation of a person or restricted item can be defined by combinations of all or a subsample of files. The risk to identify a person or restricted item by such a combination of files is not known and in consequence the risk to allow access to such a combination of files is not known.

SUMMARY

An aspect relates to a solution to evaluate a privacy risk for a combination of data files to enable an assignment of access rights to the combination of data files based on the privacy risk. It is a further aspect to provide a possibility to reduce the privacy risk of a combination of data files such that access rights can be assigned.

A first aspect concerns a system for providing a data privacy risk of data privacy related data objects comprising data related to individuals for assigning an access right for processing and storing the data objects, comprising a data extraction module, configured to receive more than one data object and extract data from the data objects, generate at least one identity space, wherein the identity space comprises those data objects which comprise extracted data elements concerning a same group of individuals or a subset of the group of individuals, and wherein the group of individuals differs from the group of individuals of each other identity space a privacy risk calculation module, configured to calculate at least one privacy risk for each identity space and for the contained individuals depending on identification probabilities of each individual based on the extracted data elements in the identity space and depending on a set of background knowledge which is assumed to be known, an export module, configured to export the extracted data, e.g., to a data storage unit and export the calculated privacy risk for assigning an access right category depending on the calculated privacy risk required to access and/or process the extracted data.

"An individual" comprises a person or a restricted item, e.g., a trade secret, a product composition or production details of a dedicated product and the like. In embodiments, the system evaluates the data object with respect to data privacy of the individual. The data object can be a data file or data table, but also a selection of data retrieved from a database. "Extracted data elements" are those extracted data which can be related to an individual. "A set of background knowledge which is assumed to be known" form a precondition. The calculated privacy risk provides the probability to identify individuals within the group of individuals by connecting a subsample of the extracted data elements to the "set of background knowledge known" by, e.g., a data user having access to the stored data objects. If the calculated privacy risk is high an access right category is assigned which is provided to only few users, e.g., the person whose information is contained in the data object, or a group of trustworthy users.

The modules of embodiments of the system provide a processing pipeline to assess more than one data object with respect to data privacy and enable limiting the access to the extracted data by the access right categories. The extracted data can be combined/connected to get a complete view of the individuals over all data sources and data types.

In an embodiment of the system the data extraction module is configured to receive data objects structured in different file formats and/or from different types of data sources.

This allows considering a variety of combinations of data objects, with data sources, e.g., file systems, file shares, cloud storages, databases, and formats, e.g., structured or unstructured, e.g., images in jpeg- or png-format, csv-files, xls-files, pdf-files, or data retrieved from a database.

In an embodiment the data extraction module is configured to detect a format of the data object required for parsing the data object.

This facilitates handling of data objects formatted in diverse data formats. The data format can be identified automatically, and corrections can be proposed for incorrect format data.

In an embodiment the data extraction module is configured to receive correction instructions from a user to correct the data format, and to extract data from the data object based on the correction instructions.

This enables an import of data even if the format cannot be automatically determined. The user is a person or device to which the privacy risk and extracted data is provided.

In embodiments, the system further comprises a risk mitigation module, configured to perform at least one mitigation function on the data of the identity space if the calculated privacy risk exceeds a predefined threshold value, and resulting in mitigated data with a possibly reduced identification probability of each individual. The risk mitigation module is configured to provide the mitigated data to the privacy risk calculation module, which is configured to calculate a new privacy risk based on the mitigated data of the identity space and output the mitigated data and the new privacy risk via the export module.

This provides the possibility to mitigate the risk by using mitigation techniques or algorithms implemented in embodiments of the system on the data. The privacy risk calculated for the mitigated data provides a measure to evaluate the mitigation process and mitigated data with respect to data privacy.

In an embodiment the system further comprises a semantics extraction module configured to detect data elements of at least one semantic type in the extracted data, wherein each semantic type represents a dedicated semantic content of the semantic data element.

This enables to select the mitigation functions depending on the detected semantic types. This results in a better alignment of the selected mitigation function to the information or content of the extracted data.

In an embodiment the semantic extraction module is configured to receive an adjustment of the detected instances of semantic types by the user.

This enables correcting a misclassification of the semantic type. In consequence the selection of mitigation functions can be enhanced by providing correct semantic types as basis for the selection.

In an embodiment the semantic extraction module is configured to adapt detection methods used to detect data elements of semantic types and/or to add at least one new detection method by an authorized person.

This enables a continuous improvement of the detection of semantic types.

In an embodiment the identity definition module is configured, for each individual of the identity space, to select a target person identifier out of all extracted data elements related to the individual in the identity space, and wherein the target person identifier uniquely identifies the individual in the identity space.

The target person identifier allows to relate more than one extracted data element to the same individual.

In an embodiment the identity definition module is configured to create at least one further identity space on different subsets of extracted data elements.

A further identity space comprises a different combination of extracted data elements for different individuals which were not covered by the previously created identity space. This provides a holistic view on the person information over the different data sources and formats through information combination, forming one or several person groups.

In an embodiment the risk mitigation module, is configured to output at least one proposed mitigation function and receive a selected mitigation function selected by the user to be applied to the identity space.

This allows to include additional knowledge of the user and to improve the mitigation process.

In an embodiment the risk mitigation module is configured to propose the at least one mitigation function based on the calculated privacy risk for the identity space to a user.

This allows a flexible adaptation of the mitigation function depending on the privacy risk and optimizing the degree of mitigation which is applied to the identity space.

In an embodiment the risk mitigation module is configured to propose the at least one mitigation function based on the data elements of semantic types to be transformed in the identity space.

This allows a flexible adaptation of the mitigation function tailored to the meaning, i.e., semantic type of the data elements.

A further aspect concerns a computer-implemented method providing a data privacy risk of data privacy related data objects comprising data related to individuals for assigning an access right for processing and storing the data objects, comprising

- receiving more than one data object and extract data from the data objects,
- generating at least one identity space, wherein the identity space comprises those data objects which comprise extracted data elements concerning a same group of individuals or a subset of the group of individuals, and wherein the group of individuals differs from the group of individuals of each other identity space,
- calculating at least one privacy risk for each identity space and for the contained individuals depending on identification probabilities of each individual based on the extracted data elements in the identity space and depending on a set of background knowledge which is assumed to be known,
- exporting the extracted data, e.g., to a data storage unit and exporting the calculated privacy risk, especially for assigning an access right category depending on the calculated privacy risk required to access and/or process the extracted data.

A further aspect concerns a computer program product (non-transitory computer readable storage medium having instructions, which when executed by a processor, perform actions) directly loadable into the internal memory of a digital computer, comprising software code portions for performing the steps as described before, when the product is run on the digital computer.

A further aspect concerns an application of embodiments of a system as claimed above, wherein the system applied for assigning an access right category to the extracted data depending on the calculated privacy risk required to store, access and/or process the extracted data.

In some embodiments, it concerns a computer-readable storage medium having computer program instructions stored thereon, which perform the steps of the method when executed by a processor.

BRIEF DESCRIPTION

Figure 2:
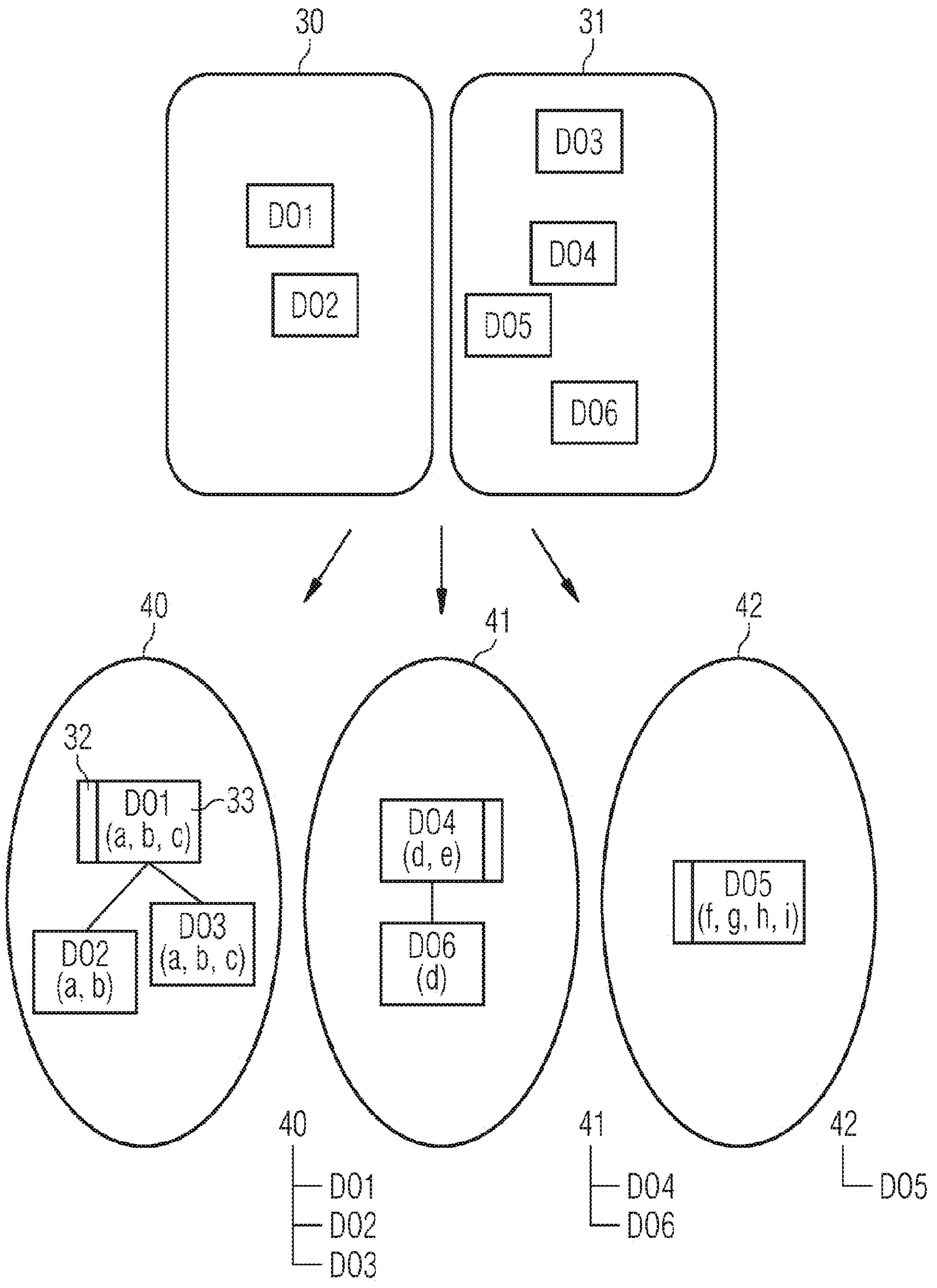
Figure 3:
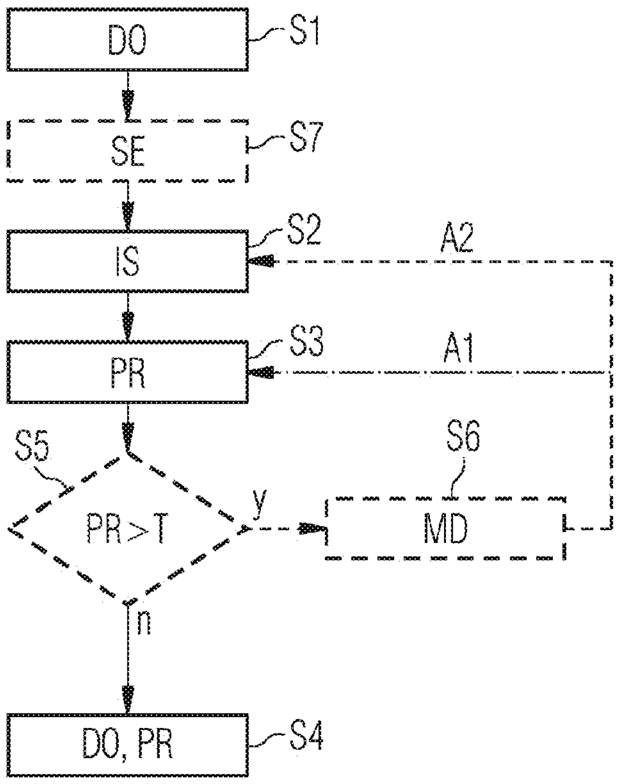

Some of the embodiments will be described in detail, with references to the following Figures, wherein like designations denote like members, wherein:

FIG. 1 schematically illustrates an embodiment of the inventive system:

FIG. 2 schematically illustrates an embodiment of generating identity spaces from data objects in different data sources: and FIG. 3 shows an embodiment of the inventive method as a flow chart.

DETAILED DESCRIPTION

It is noted that in the following detailed description of embodiments, the accompanying drawings are only schematic, and the illustrated elements are not necessarily shown to scale. Rather, the drawings are intended to illustrate functions and the co-operation of components. Here, it is to be understood that any connection or coupling of functional blocks, modules or other physical or functional elements could also be implemented by an indirect connection or coupling. e.g., via one or more intermediate elements. A connection or a coupling of elements or module can for example be implemented by a wire-based, a wireless connection and/or a combination of a wire-based and a wireless connection. Modules can be implemented by dedicated hardware, e.g., processor, firmware or by software, and/or by a combination of dedicated hardware and firmware and software. It is further noted that each module described for embodiments of the system can perform a functional step of the related method and vice versa.

Data related to data privacy is data which contains personal information, which is covered by law; e.g., by the General Data Privacy Regulation (GDPR) under law of the European Union. Further on, data related to data privacy is data concerning restricted items which shall be kept secret and not be retrievable or derivable by any unauthorized person. Person or restricted item are further on called individual. Information concerning the individual can be scattered across several different data sources, and the risk to conclude privacy related information from these several data sources can be higher than the risk provided by one single data source. A data user or a data processing pipeline does not have the skills to assess whether the data contained in the data source is any privacy risk as a whole and especially which information in the data is responsible for this risk. The lack of skill can be due to limited data and privacy knowledge, as well as due to the information complexity, e.g., the amount of information scattered across different data sources which can be combined to form a privacy risk.

A technical means to provide data privacy is to limit access to retrieve or process one or several data objects containing data related to data privacy and to provide access rights. To provide adequate access, different access right categories can be assigned depending on the risk to conclude an individual based on the accessed data. The proposed system evaluates data sources and outputs the privacy risk of received data objects and exports the privacy risk, which is used to assign access right categories depending on the exported privacy risk.

FIG. 1 shows a system 20 comprising a data extraction module 21, an identity definition module 23, a privacy risk calculation module 24 and an export module 26. The data extraction module 21 is configured to receive more than one data object and extract data from the data objects and forwards the data objects comprising the extracted data to the identity definition module 23. The identity definition module 23 is configured to generate at least one identity space, wherein the identity space comprises those data objects which comprise extracted data elements concerning a group of individuals or a subset of the group of individuals, and wherein the group of individuals of this identity space differs from the group of individuals of each other identity space. The privacy risk calculation module 24 is configured to calculate at least one privacy risk for each identity space and for the contained individuals depending on re-identification probabilities of each individual based on the extracted data elements in the identity space and depending on a set of background knowledge which is assumed to be known. The export module 26 is configured to export the extracted data and the calculated privacy risk for the extracted data.

In an embodiment the system 20 additionally comprises a semantics extraction module 22, which is configured to detect semantic data elements, which are data elements of at least one semantic type in the extracted data, wherein each semantic type represents a dedicated semantic content of the semantic data element. In an embodiment the system 20 additionally comprises a risk mitigation module 25, which is configured to select the mitigation function depending on the detected semantic types.

In an embodiment the system 20 further comprises a risk mitigation module 25 which is configured to perform at least one mitigation function on the extracted data of data objects in the identity space if the calculated privacy risk exceeds a predefined threshold value. The mitigation module 25 outputs mitigated data which are modified such to provide less or no information identifying the individual. The mitigated data is forwarded and input to the privacy risk calculation module 24. The privacy risk calculation module 24 processes the mitigated data and calculates at least one new privacy risk based on the mitigated data of the identity space. The mitigated data and the new privacy risk is forwarded to the export module 26 to output the mitigated data and the new privacy risk. In some embodiments, the mitigated data can be provided as input to the identity definition module 23 and processed by the identity definition module 23, privacy risk calculation module 24 in cycles, e.g., until a resulting privacy risk reaches a predefined privacy risk. Processing in the identity definition module 23 is optional in following cycles, as no changes in the identity spaces might be needed.

Each of the modules of embodiments of the system 20 is described in more detail below.

The data extraction module 21 is configured to receive more than one data object 10, and extract data from the more than one data objects 10. The data extraction module 21 is configured to receive data objects 10 structured in different formats, and/or from different types of data sources. The more than one data object 10 can comprise, e.g., a text file 11, audio file 12 or image file 13. It is further configured to detect a format of the data object required for parsing the data object. Data objects 10 can not only comprise data files or data tables, but also tables from a database.

The data extraction module 21 supports the loading/import of data objects 10 from different data sources, e.g., file system, databases, shares, cloud storages, and data objects of different formats, data types, e.g., structured or unstructured, like csv, excel, pdfs, image, databases. The format of the data object is automatically detected. It extracts or predicts the format parameters for the given data object to parse the data. In an embodiment the system comprises a user interface 27, e.g., a graphical user interface, configured to display the extracted or predicted parameters to a user. The user can adjust the parameters and input respective correction instructions via the user interface 27. The data extraction module 21 receives the correction instructions, corrects the data format, and extracts the data from the data object 11, 12, 13 based on the correction instructions respectively.

Before the extracted data is forwarded to the identity definition module 23, the extracted data is optionally forwarded to the semantics extraction module 22. Based on the content and data type, semantic types are automatically detected in the extracted data. Semantic types help to understand the occurrences of specific information in the data on a higher more abstract semantic level, e.g., email address for all found specific email addresses, addresses, names, and the like. Semantic data elements which could be assigned to a semantic type can be detected format independently in structured data, e.g., csv or tabular data, unstructured data, e.g., text files, or image data, e.g., with face or text recognition.

It is possible that several semantic types are found for the same data element. E.g., the semantic type "car name" as well as the semantic type "person name" can be assigned to the same data element. An automatic detection functionality in the semantics extraction module 22 is based on a combination of identification libraries, search patterns, e.g., regular expressions and AI algorithms to reason and recognize the most likely semantic types. The semantic data element and the semantic type assigned to it can be forwarded to the user interface 27. The user interface 27 can receive corrections on the data elements of semantic types by deleting data elements of semantic types or highlighting and adding missed data as data elements of semantic types. The assigned instance of semantic type (label) can be adjusted if the data element is misclassified. Furthermore, completely new semantic types can be received via the user interface 27 by defining and/or adding an identification method, e.g., the regular expression or Artificial Intelligence (AI) algorithm to embodiments of the system 20.

Additionally, a hierarchy of semantic types can be defined. As an example, a hierarchy level comprises "car names" and the next lower hierarchy comprises specific car names from different manufacturers. This allows to select or provide more fine-grained mitigation methods in the risk mitigation module 25. Mapping semantic types to the extracted data elements in the data object provides the advantage that the user gets a better understanding of what kind of information is available in the data objects.

The extracted data is forwarded to the identity definition module 23, configured to generate at least one identity space, wherein the identity space comprises those data objects which comprise extracted data elements concerning a group of individuals or a subset of the group of individuals, and wherein the group of individuals differs from the group of individuals of each other identity space. To calculate the risk to identify the individual, it has to be known which portions of data belongs to the individual. Each portion of data belonging to or concerning the individual is called an extracted data element. The identity definition module 23 identifies all extracted data elements belonging to individuals over several data objects.

The generation of identity spaces is illustrated in FIG. 2. Two data objects, DO1, DO2 were received from data source 30 and further data objects DO3, . . . , DO6 were received from data source 31 via the data extraction module 21. Data is extracted from the data objects DO1 . . . , DO6. In the identity definition module 23 the extracted data elements, i.e., those data concerning an individual are identified. The extracted data elements can be one or several entries in the structured data object, e.g., a row in the data object 10 structured as csv file, or one or more occurrences in an unstructured data type, e.g., a face or other object in data object O3 which is an image or a text passage comprising a name in data object DO4 which a text document. The extracted data elements from the different data objects DO1 . . . , DO6 must be connected to form a holistic view on the individual or a group of individuals. All extracted data elements belonging to one of the individuals and the group of individuals due to the connections are called "Identity Space".

In the embodiment illustrated in FIG. 2, the identity definition module 23 identified in data object DO1, DO2, DO3 extracted data elements concerning individuals a, b and/or a, b, c. An identity space 40 is generated comprising data objects DO1, DO2, DO3 comprising extracted data elements concerning individuals a, b and/or a, b, c. Extracted data elements concerning individuals a, b and/or a, b, c were not identified in any other of the received data objects DO4, DO5, DO6. Identity definition module 23 identifies in the data objects DO4, DO6 extracted data elements of individual d and/or individual e. Extracted data element concerning individual d and/or e are not identified in any of the other received data objects DO1, DO2, DO3, DO5. Therefore, identity definition module 23 generates identity space 41 comprising data objects DO4 and DO6. Identity definition module 23 identified extracted data elements of individuals e and h only in data object DO5, but in no other data object DO1, . . . DO4, DO6. Therefore, identity space 42 is generated comprising data object DO5.

In an embodiment of the system 20 supports the user to generate identity spaces by connecting the extracted data elements from different data sources and data types over given common information, i.e., extracted data elements, via the user interface 27. In an embodiment the system 20 supports the user in this task by proposing automatically detected connections, found by advanced algorithms, to the user.

For structured data objects several extracted data elements, e.g., lines in a document, may belong to the same individual. Therefore, the extracted data elements or combinations of extracted data elements, i.e., attribute or attribute combinations identifying the same individual are marked in the identity space through a target person identifier uniquely identifying this individual. Within an identity space, where several data objects are connected, is sufficient to define the target person identifier for a central data object to which the other data objects are attached to.

In FIG. 2, in identity space 40 the target identifier 32 is assigned to data object DO1. The target person identifier 33 is not assigned to the data objects DO2, DO3 which are connected to DO1. In an embodiment the target person identifier is automatically identified by algorithms and forwarded to the user interface to be proposed to the user. If no target person identifier is defined or detected, each extracted data element in the data object, e.g., a structured file, is assigned to another individual. This could lead to unwanted false risk calculations.

In data objects of unstructured format, it is more complicated to identify and assign extracted data elements compared to data objects of structured data, where several extracted data elements belong together by definition, as they are in the same file, and form information of the same individual (e.g., one row in a csv). For data objects of unstructured format, only information snippets labeled with a semantic type, are found and extracted from the data object. This is a single information, e.g., a name, an address, an email, a face. Advanced methods can be used to find the information snippets belonging to a specific individual WITHIN this file to finally connect it to the extracted data elements from other data objects. It is possible that only one snippet information is added. Since extracted data elements are collected over several data objects, several identity spaces will be created. Each identity space will hold a unique person group, see FIG. 2.

The privacy risk calculation module 24 is configured to calculate the privacy risk for each individual in the identity space. Further, a risk score is calculated for the whole identity space across all individual privacy risks. The privacy risk represents the probability to re-identify an individual in the available identity space. It describes how unique an individual is in a given population given that an attacker knows a specific extracted data elements of the individual information and therefor can be identified. If an individual as defined in an identity space is perfectly unique, the risk of re-identification the individual is at 100%. This is known as Prosecutor and Journalist Risk. But also, other information can be incorporated into the risk, e.g., the security measures in place to protect this data.

In cases when the user must point out which information an attacker might know and for this attribute combination the risk is calculated for each individual in the group. This drives blind spots as the user might choose the wrong combination not knowing that specific available information, i.e., extracted data element or semantic data element, would result in much higher risks. In the described approach this information is not asked from or provided by the user. The privacy risk calculation module 24 calculates the risk for each possible combination and presents the calculated risks to the user for his further analysis, especially for assigning an access right category to the extracted data contained in the data objects of the respective identity space related to the individual or group of individuals. This could be very time consuming depending on the number of extracted data elements and/or semantic data elements available or depending on the hardware embodiments of the system is running on.

The required calculation time can be adjusted by applying filters on the calculations needed, by the user. Filters are e.g.:—the exclusion of attributes as the user knows that this data element is not available to the attacker, maximal or minimal number of attributes in the combinations, all combinations including specific attributes or the maximal tolerable privacy risk.

All specifications of this combination by adding more attributes will result in a higher privacy risk. Consequently, they can be skipped from calculation if the combination is already above the specific threshold.

The calculated privacy risks are output by the export module 26 and/or provided by the user interface 27 to the user. With this the user has all information available to decide where intolerable risks are, and which attributes belong to this risk. Through the combination propagation, he will also be able to see which attributes are driving the risk and should be potentially transformed in the following step.

The risk mitigation module 25 comprises a toolset to reduce the privacy risk. The risk mitigation module 25 is configured to propose the at least one mitigation function based on the calculated privacy risk for the identity space. The risk mitigation module is configured to output at least one proposed mitigation function and receive a selected mitigation function selected by the user to be applied to the identity space. It offers implementations of various mitigation algorithms such as deletion, aggregation, generalization, k-anonymity, and furthermore. The user can select which data elements/attribute(s) to transform, the appropriate algorithm and the correct parameters. The mitigation algorithms finally form a pipeline which will then be executed by embodiments of the system 20. New to that is, that the previously collected information on semantic types and the privacy risk helps the user to select the correct attributes and a useful mitigation strategy.

The user can make an informed decision which data elements have to be transformed. By selecting the attribute, the user gets further hints how the information can be transformed based on its semantic type. E.g., when an attribute is selected where the semantic type "Email" was detected, the user gets adequate suggestions how Emails can be transformed. E.g., by removing everything before the "@"-sign with the substitution algorithm and the proper parameters are shown. The proposed mitigation algorithms are filtered based on the target data format. Specific methods are not possible or useful for e.g., images. These are not shown to the user.

The mitigation process is applied on the identity spaces. Consequently, the changes must be applied on a copy of the different original data types in the specific format.

The data export module 26 is configured to output transformed, i.e., extracted data which are modified or corrected by the data extraction module 21. The data export module 26 is configured to output mitigated data and provide them for further use, especially for assigning the access right category for accessing and processing the extracted and/or mitigated data. The data export module 26 provides modes of data aggregation, export, and download.

In embodiments, the system 20 as described is applied for providing a privacy risk to re-identify an individual for extracted data of data objects and assigning access right categories to depending on the calculated privacy risk required to access and/or process the extracted data.

A method for providing data privacy risk of data privacy related data objects in accordance with system 20 is illustrated in FIG. 3. In a first step S1 of embodiments of the method, more than one data object DO is extracted and data from the data objects are extracted. In some embodiments, detect data elements of at least one semantic type are detected in the extracted data, wherein each semantic type represents a dedicated semantic content of the detected data element, see step S7. At least one identity space IS, 40 is generated in step S2, wherein the identity space comprises those data objects which comprise extracted data elements concerning a group of individuals or a subset of the group of individuals, and wherein the group of individuals differs from the group of individuals of each other identity space. In step S3 at least one privacy risk PR for each identity space and for the contained individuals is calculated depending on re-identification probabilities of each individual based on the extracted data elements in the identity space and depending on a set of background knowledge which is assumed to be known. In step S4, the extracted data and the calculated privacy risk are exported.

In some embodiments, the calculated privacy risk PR is compared with a predetermined threshold value T, see step S5. If the privacy risk PR is higher than the threshold value T, at least one mitigation function is performed on the data of the identity space, see step S6, resulting in mitigated data. The mitigated data are expected to have a reduced re-identification probability of each individual. In an alternative A1 the privacy risk is calculated for the mitigated data according to step S3 but based on mitigated data instead of the original extracted data. In alternative A2, step S2 is performed on the mitigated data, i.e., data elements of at least one semantic type are detected in the mitigated data. In both alternatives A1, A2 the mitigated data are further processed by steps S3, S5 and S6 until the calculated privacy risk is below the threshold value T or the process is stopped in another way. As last step, see S4, the mitigated data and the new privacy risk are exported.

The entire system is built around a holistic, person-centered view. The possibility to combine data of various types, structures, and sources offers a greater level of reality and allows to consider privacy risks across domains and media types. The person-centered view has impact on the whole pipeline as described above. The definition of the identity spaces is new, the way to calculate the risk is new, and the mitigation as well as the modification in the different sources is a new approach.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A system for providing a data privacy risk of data privacy related data objects comprising data related to individuals for assigning an access right for processing and storing the data objects, the system comprising:

- a data extraction module configured to receive data objects and extract data from the data objects,
- an identity definition module configured to generate at least one identity space, wherein the at least one identity space comprises the data objects which comprise extracted data elements concerning a group of individuals or a subset of the group of individuals, wherein the extracted data elements are extracted data which can be related to an individual, and wherein the group of individuals differs from the group of individuals of each other identity space,
- a privacy risk calculation module configured to calculate at least one privacy risk for each identity space and for the individuals in each identity space depending on re-identification probabilities of each individual based on the extracted data elements in the at least one identity space and depending on a set of background knowledge which is assumed to be known, an export module configured to export the extracted data and export the calculated privacy risk, and
- a risk mitigation module configured to perform at least one mitigation function on the extracted data of the at least one identity space if the calculated privacy risk exceeds a predefined threshold value, and resulting in mitigated data with a reduced re-identification probability of each individual, provide the mitigated data to the privacy risk calculation module, which is configured to calculate a new privacy risk based on the mitigated data of the at least one identity space and output the mitigated data and the new privacy risk via the export module.

2. The system according to claim 1, wherein the data extraction module is configured to receive the data objects structured in different file formats and/or from different types of data sources.

3. The system according to claim 2, wherein the data extraction module is configured to detect a format of the data objects required for parsing the data objects.

4. The system according to claim 1, wherein the data extraction module is configured to receive correction instructions from a user to correct a data format, and to extract data from the data objects based on the correction instructions.

5. The system according to claim 1, comprising:

- a semantics extraction module configured to detect semantic data elements, which are data elements of at least one semantic type in the extracted data, wherein each semantic type represents a dedicated semantic content of the semantic data elements.

6. The system according to claim 5, wherein the semantic extraction module is configured to receive an adjustment of the detected instances of semantic types by a user.

7. The system according to claim 5, wherein the semantic extraction module is configured to adapt detection methods used to detect data elements of semantic types and/or to add at least one new detection method by an authorized person.

8. The system according to claim 1, wherein the identity definition module is configured, for each individual of the at least one identity space, to select a target person identifier out of the extracted data elements related to the individual in the at least one identity space, and wherein the target person identifier uniquely identifies the individual in the at least one identity space.

9. The system according to claim 1, wherein the identity definition module is configured to create at least one further identity space on different subsets of the extracted data elements.

10. The system according to claim 1, wherein the risk mitigation module is configured to output at least one proposed mitigation function and receive a selected mitigation function selected by a user to be applied to the at least one identity space.

11. The system according to claim 10, wherein the risk mitigation module is configured to propose the at least one mitigation function based on the calculated privacy risk for the at least one identity space.

12. The system according to claim 10, wherein the risk mitigation module is configured to propose the at least one mitigation function based on the data elements of semantic types to be transformed in the at least one identity space.

13. A computer-implemented method for providing a data privacy risk of data privacy related data objects comprising data related to individuals for assigning an access right for processing and storing the data objects, the method comprising:

- receiving data objects and extracting data from the data objects, generating at least one identity space, wherein the at least one identity space comprises the data objects which comprise extracted data elements concerning a group of individuals or a subset of the group of individuals, wherein the extracted data elements are extracted data which can be related to an individual, and wherein the group of individuals differs from the group of individuals of each other identity space, calculating at least one privacy risk for each identity space and for the individuals in each identity space depending on re-identification probabilities of each individual based on the extracted data elements in the at least one identity space and depending on a set of background knowledge which is assumed to be known, exporting the extracted data and exporting the calculated privacy risk, and performing at least one mitigation function on the extracted data of the at least one identity space if the calculated privacy risk exceeds a predefined threshold value, and resulting in mitigated data with a reduced re-identification probability of each individual, providing the mitigated data to a privacy risk calculation module, which is configured to calculate a new privacy risk based on the mitigated data of the at least one identity space and output the mitigated data and the new privacy risk via an export module.

14. A computer program product, comprising a non-transitory computer readable hardware storage device having computer readable program code stored therein, said program code executable by a processor of a computer system to implement a method of claim 13 when the product is run on the computer system.

15. A method comprising utilizing the system according to claim 1, wherein the system is applied for assigning an access right category to the extracted data depending on the calculated privacy risk required to access and/or process the extracted data.

* * * * *